US011037146B2

(12) United States Patent
Payne et al.

(10) Patent No.: US 11,037,146 B2
(45) Date of Patent: Jun. 15, 2021

(54) MANAGING PRODUCT RETURNS ASSOCIATED WITH A USER DEVICE

(71) Applicant: Walmart Apollo, LLC, Bentonville, AR (US)

(72) Inventors: Michael Lawrence Payne, Centerton, AR (US); Jimmie Clark, Fayetteville, AR (US); Kevin M. Charles, Bentonville, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 253 days.

(21) Appl. No.: 15/782,730

(22) Filed: Oct. 12, 2017

(65) Prior Publication Data

US 2018/0174142 A1 Jun. 21, 2018

Related U.S. Application Data

(60) Provisional application No. 62/437,389, filed on Dec. 21, 2016.

(51) Int. Cl.
*G06Q 20/40* (2012.01)
*G06Q 20/20* (2012.01)
(Continued)

(52) U.S. Cl.
CPC ........... *G06Q 20/40* (2013.01); *G06Q 10/087* (2013.01); *G06Q 20/203* (2013.01);
(Continued)

(58) Field of Classification Search
CPC .... G06Q 20/40; G06Q 10/087; G06Q 20/203; G06Q 20/206; G06Q 20/208;
(Continued)

(56) References Cited

U.S. PATENT DOCUMENTS

| 8,676,653 | B2 | 3/2014 | Argue et al. | |
|---|---|---|---|---|
| 2007/0094087 | A1* | 4/2007 | Mitchell | G06Q 20/0453 705/22 |
| 2009/0171815 | A1* | 7/2009 | Wang | G06Q 10/08 705/28 |
| 2010/0235290 | A1* | 9/2010 | Junger | G06Q 10/0833 705/304 |

(Continued)

OTHER PUBLICATIONS

Changli Feng and Lili Xie, A Study on Returns Logistics Operating Mode in E-business Environment (Year: 2006).*

*Primary Examiner* — Florian M Zeender
*Assistant Examiner* — Nicole Elena Bruner

(57) ABSTRACT

Examples of the disclosure provide systems and methods for managing product returns. A computing system receives, from a user device, a request for returning a product, compares device identifier data associated with the user device with registered data associated with one or more customer accounts to identify a first customer account associated with the user device, analyzes transaction data associated with the first customer account to determine whether the product is associated with the first customer account, generates an instruction to position the product in a predetermined area, and determines whether the product is positioned in the predetermined area to facilitate a return of the product. Aspects of the disclosure may improve user experience, user efficiency, and/or user interaction performance by processing a product return in an effective and efficient manner.

18 Claims, 7 Drawing Sheets

(51) Int. Cl.
  *G06Q 10/08* (2012.01)
  *G06Q 20/32* (2012.01)
  *G06Q 30/06* (2012.01)
  *G07F 7/06* (2006.01)

(52) U.S. Cl.
  CPC ......... *G06Q 20/206* (2013.01); *G06Q 20/208* (2013.01); *G06Q 20/3278* (2013.01); *G06Q 20/401* (2013.01); *G06Q 20/407* (2013.01); *G06Q 30/06* (2013.01); *G07F 7/06* (2013.01)

(58) Field of Classification Search
  CPC ............. G06Q 20/3278; G06Q 20/401; G06Q 20/407; G06Q 30/06; G07F 7/06
  USPC .......................................................... 705/28
  See application file for complete search history.

(56) References Cited

U.S. PATENT DOCUMENTS

| | | | |
|---|---|---|---|
| 2012/0166553 A1* | 6/2012 | Rubinstein | G06Q 50/01 709/206 |
| 2012/0290609 A1* | 11/2012 | Britt | G06Q 20/327 707/769 |
| 2013/0085889 A1 | 4/2013 | Fitting et al. | |
| 2014/0122268 A1* | 5/2014 | Argue | G06Q 20/20 705/18 |
| 2014/0122270 A1* | 5/2014 | Argue | G06Q 20/0453 705/21 |
| 2015/0254666 A1 | 9/2015 | Agasti et al. | |
| 2018/0096332 A1* | 4/2018 | O'Herlihy | G07G 1/0063 |
| 2018/0096566 A1* | 4/2018 | Blair, II | G06Q 20/3278 |
| 2018/0114228 A1* | 4/2018 | Singh | G06Q 30/016 |

* cited by examiner

MANAGING PRODUCT RETURNS ASSOCIATED WITH A USER DEVICE

BACKGROUND

Products may be returned to one or more merchants for various reasons. For example, a purchased product may be inconsistent with a customer expectation. At least some known methods and systems for processing product returns require a great degree of human involvement and may be tedious, time-consuming, and/or error-prone.

SUMMARY

Examples of the disclosure provide a computing system for managing one or more product returns. The computing system includes a memory device storing data associated with one or more customer accounts and computer-executable instructions, and a processor configured to execute the computer-executable instructions to receive, from a user device, a request for returning a product, compare device identifier data associated with the user device with registered data associated with the customer accounts to identify a first customer account associated with the user device, analyze transaction data associated with the first customer account to determine whether the product is associated with the first customer account, generate an instruction to position the product in a predetermined area, and determine whether the product is positioned in the predetermined area to facilitate a return of the product.

In another aspect, one or more computer storage media embodied with computer-executable instructions are provided. The computer storage media include a request component that obtains identifier data, and analyzes the identifier data to identify a request for returning a product, an account component that compares the identifier data with registered data associated with one or more customer accounts to identify a first customer account associated with the request, and uses the first customer account to determine whether the possessor is associated with the product, and a location component that generates a prompt to position the product in a predetermined area, and determines whether the product is positioned in the predetermined area.

In yet another aspect, a computer-implemented method is provided for managing one or more product returns. The computer-implemented method includes identifying a request for returning a product, prompting a user to position the product in a predetermined area, receiving, from one or more sensor devices, scan data associated with an article positioned in the predetermined area, analyzing the scan data to identify product identifier data associated with the article, and analyzing the product identifier data associated with the article to determine whether the article is the product to facilitate a product return of the product.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

Figure 1:
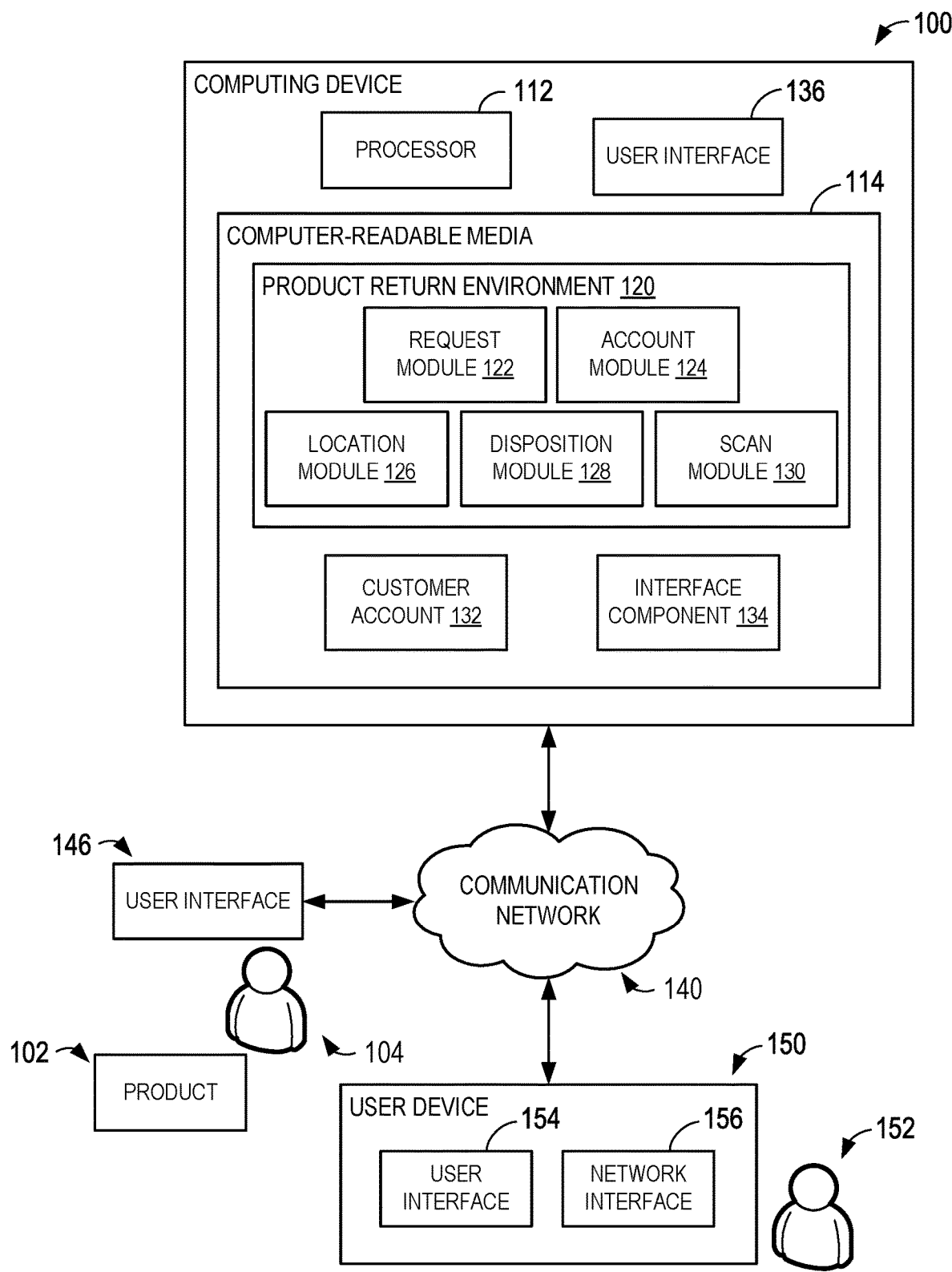
FIG. 1 is a block diagram illustrating an example computing device for managing product returns associated with a user device.

Referring to the figures, examples of the disclosure enable one or more product returns and/or exchanges to be managed using data associated with a user device. A product return or exchange may be facilitated, for example, by uniquely identifying a user device. Device identifier data associated with the user device, for example, may be used to identify a customer account associated with the user device. The customer account may include or be associated with registered data and/or transaction data that enables a product, a transaction (e.g., a purchase of the product), and/or a user to be identified for processing the product return. At least some examples of the disclosure may describe a retail business environment. However, aspects of the disclosure are not limited to a retail business environment.

Aspects of the disclosure provide for a computing device that performs one or more operations in an environment including a plurality of devices coupled to each other via a network (e.g., a local area network (LAN), a wide area network (WAN), the Internet). For example, a computing device may communicate with one or more peripheral devices, user devices, and/or system servers to process one or more product returns. In some embodiments, the computing device analyzes data associated with a user device to uniquely identify the user device, such that the computing device is enabled to determine whether a product is eligible for a product return and/or whether a user is authorized to return the product.

The systems and processes described herein may be implemented using computer programming or engineering techniques including computer software, firmware, hardware or a combination or subset thereof. Aspects of the disclosure improve user experience, user efficiency, and/or user interaction performance by processing a product return in an effective and efficient manner. Additionally, some aspects facilitate improving processor security, data integrity, data transmission security, and/or communication between computing systems by controlling communications and managing access to various accounts using a central computing system (e.g., computing device 100); improving customer confidence in merchant institutions by using data tailored to or associated with a customer; and/or reducing error rate by automating the processing of large volumes of data. Moreover, some aspects may increase processor speed and/or improve operating system resource allocation.

The technical effect of the systems and processes described herein is achieved by performing at least one of the following operations: a) analyzing a message to identify identifier data; b) generating scan data associated with an article; c) analyzing scan data to identify identifier data; d) using identifier data to identify an article; e) generating an instruction to provide additional information; f) enhancing identifier data with additional information; g) analyzing identifier data to identify a request for returning a product; h) determining whether a product is eligible for a product return; i) determining whether a customer is authorized to return the product; j) comparing identifier data with account data to identify a customer account; k) analyzing account data to identify an article associated with a customer account; l) comparing identifier data with account data to authenticate a customer; m) generating an instruction to position a product in a predetermined area; n) determining whether a product is positioned in a predetermined area; o) comparing identifier data with reference data to determine whether an article is a product; and/or p) generating a disposition code associated with a request for returning a product.

FIG. 1 is a block diagram illustrating an example computing device 100 for managing one or more product returns. A product 102 (e.g., a good or service) may be obtained from a product provider or merchant through a purchase transaction in exchange for a payment to the merchant. The computing device 100 represents a system configured to process one or more product returns. In some examples, the computing device 100 allows a customer, such as a possessor 104 of the product 102, to return the product 102 to the merchant in exchange for money, credit, another product, and/or other consideration (e.g., through a return transaction).

The computing device 100 may include one or more computing systems that execute instructions (e.g., as application programs, operating system functionality, or both) to implement one or more operations as described herein. In some examples, the computing device 100 includes a group of processing units or other computing devices. The computing device 100 may include, for example, a desktop personal computer, a kiosk, a tabletop device, an industrial control device, a wireless charging station, and/or an electric automobile charging station. Additionally, or alternatively, the computing device 100 may include more-portable devices, such as a mobile computing device or any other portable device. For example, the mobile computing device may include a mobile telephone, a laptop, a tablet, a computing pad, a netbook, a gaming device, and/or a portable media player.

In some examples, the computing device 100 has at least one processor 112 and computer-readable media 114. The processor 112 includes any quantity of processing units, and is programmed to execute computer-executable instructions for implementing aspects of the disclosure. The instructions may be performed, for example, by one or more processors 112 within the computing device 100 (as shown in FIG. 1). Additionally, or alternatively, the instructions may be performed by at least one processor external to the computing device 100. The processor 112 may represent an implementation of analog techniques to perform the operations described herein. For example, the operations may be performed by an analog computing device and/or a digital computing device.

Figure 3:
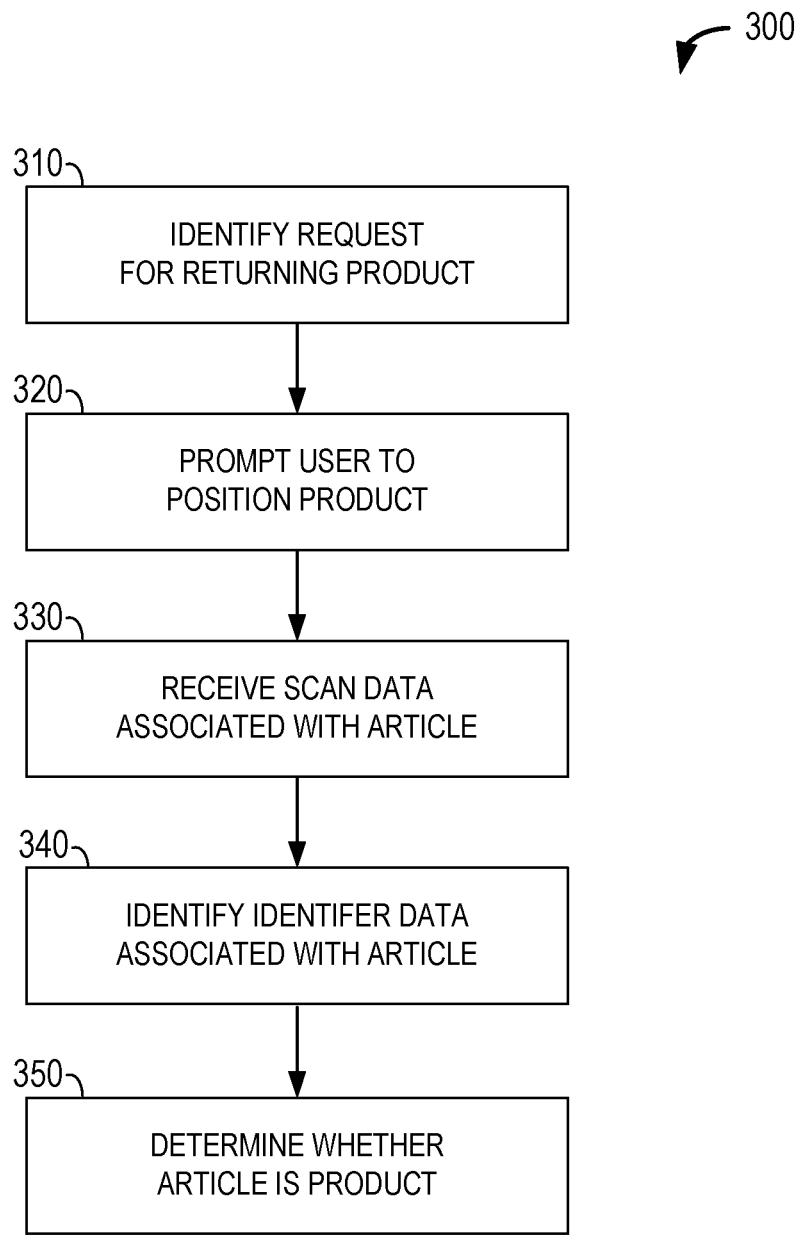
FIG. 3 is a flowchart illustrating an example method for managing a product return associated with a user device using a computing device, such as the computing device shown in FIG. 1.
Figure 4:
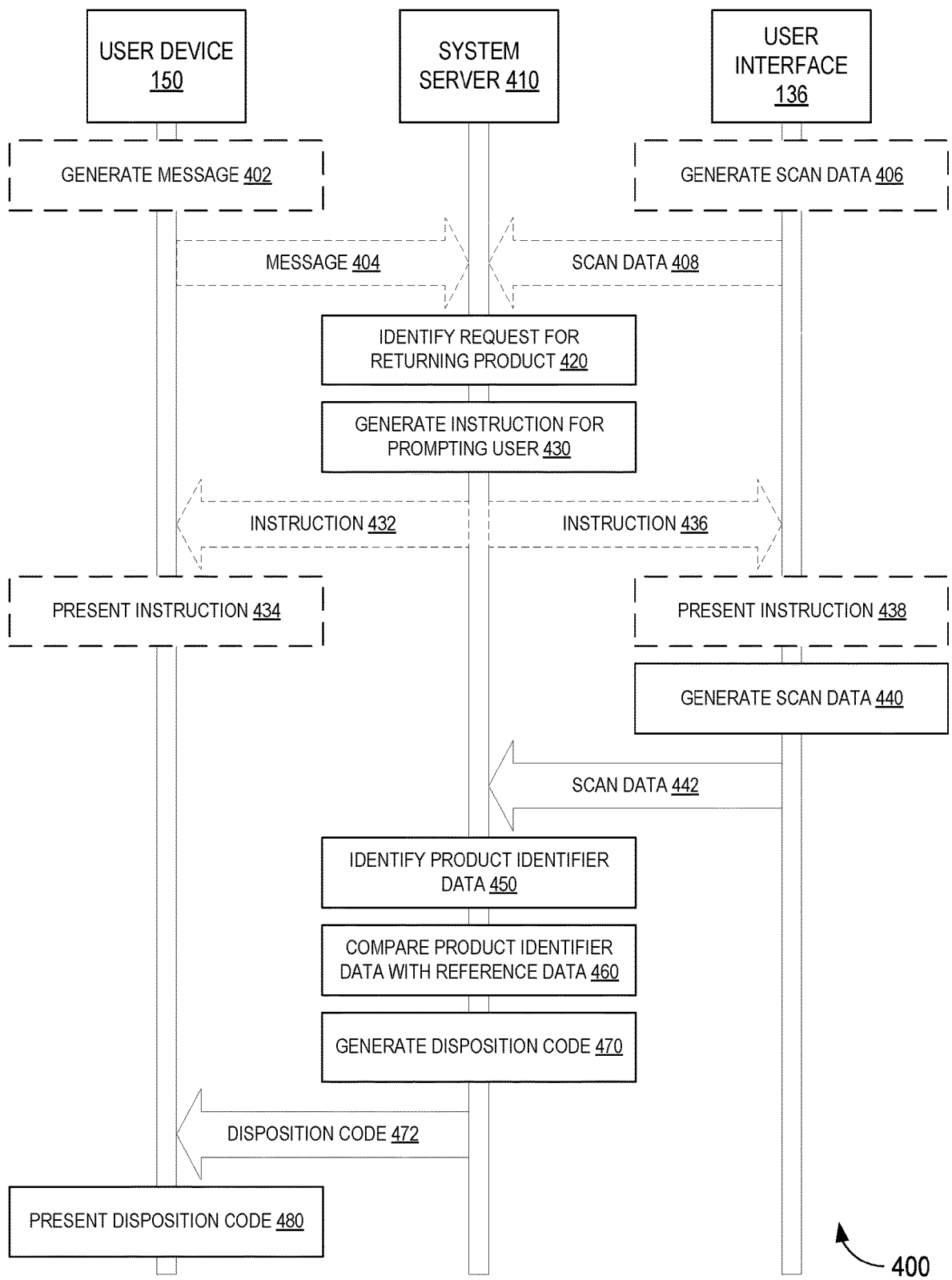
FIG. 4 is a sequence diagram illustrating example operations for managing a product return associated with a user device.
Figure 5:
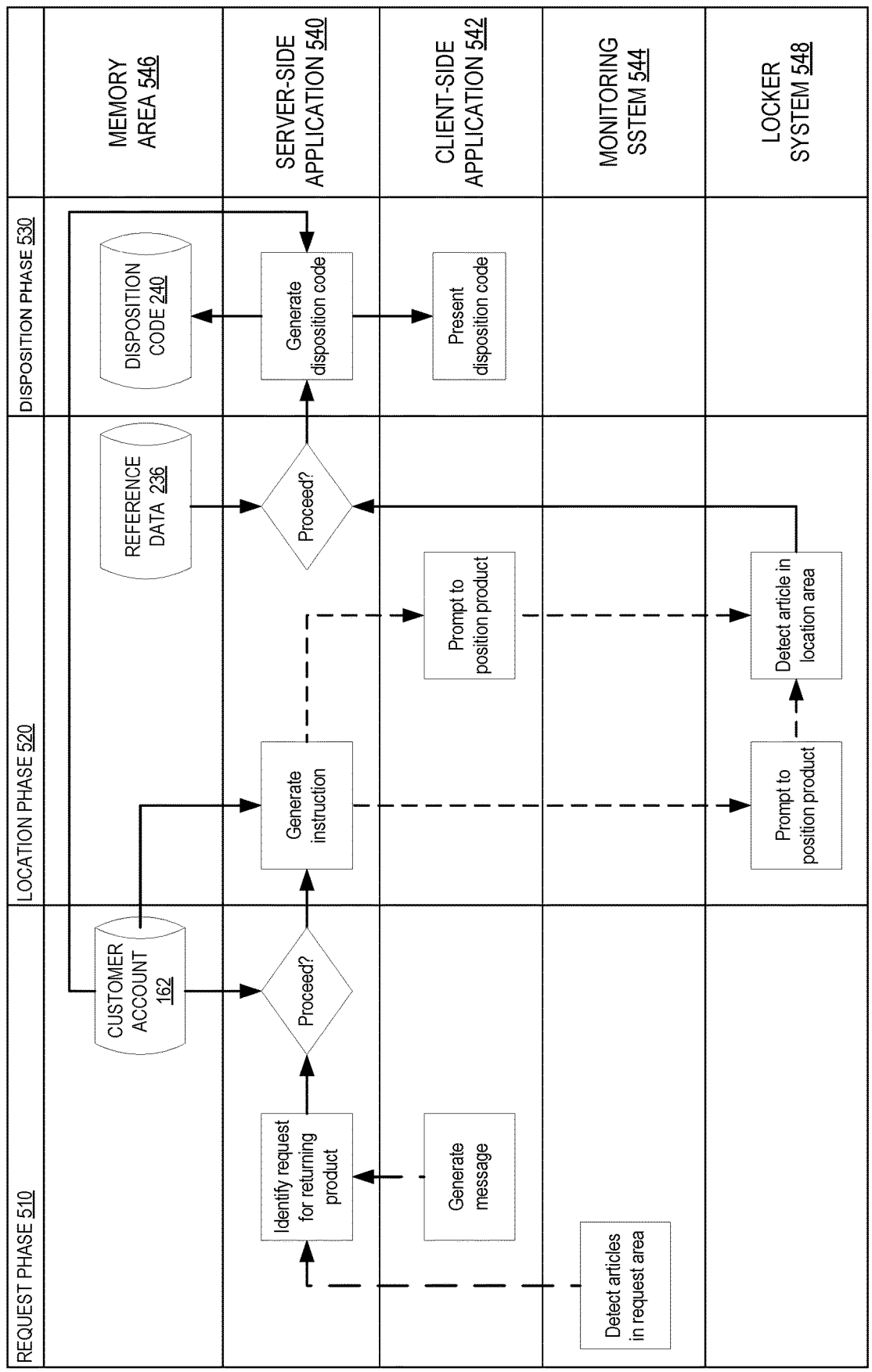
FIG. 5 is a flow diagram illustrating an example data flow for managing a product return associated with a user device.

In some examples, the processor 112 is programmed to execute instructions, such as those illustrated in the figures (e.g., FIGS. 3-5). The instructions may be stored and/or maintained at the computer-readable media 114. The computer-readable media 114 includes any quantity of media associated with or accessible by the computing device 100. The computer-readable media 114 may be internal to the computing device 100 (as shown in FIG. 1), external to the computing device 100, or both. For example, the computer-readable media 114 may include data stored locally at the computing device 100, data access points stored locally at the computing device 100 and associated with data stored remote from the computing device 100, or any combination of local and remote data. In some examples, the computer-readable media 114 includes read-only memory and/or memory wired into an analog computing device.

The computer-readable media 114 stores and/or maintains, among other data, one or more applications. The applications, when executed by the processor 112, operate to perform functionality on the computing device 100. Example applications include a product return environment 120, which may represent an application for processing product returns. The product return environment 120 may provide one or more computer-executable components for managing one or more product returns. In some examples, the product return environment 120 includes a request module 122, an account module 124, a location module 126, a disposition module 128, and a scan module 130.

The request module 122 is a component of the product return environment 120 that identifies a request for returning a product 102. The request module 122 may interpret or identify, for example, a message demonstrating a user desire to return the product 102 as a request for returning the product 102. Additionally, or alternatively, the request module 122 may interpret or identify one or more objects or articles (e.g., product 102, user device 150, a body part of a customer, an identification card, a purchase receipt) positioned in a predetermined request area as being a request for returning the product 102.

The account module 124 is a component of the product return environment 120 that analyzes the request for returning the product 102 to determine whether to authorize the request. The account module 124 may analyze the request to determine whether the product 102 is eligible for a product return and/or whether a customer (e.g., possessor 104) is authorized to return the product 102. In some examples, the account module 124 uses one or more customer accounts 132 stored and/or maintained at the computer-readable media 114 to identify one or more products 102 eligible for the product return and/or one or more customers authorized to return the product 102. Data associated with the customer accounts 132, for example, may be compared with data associated with the request to identify a customer account 132 associated with the request. In some examples, the account module 124 authorizes the request to return the product 102 if the product 102 and the possessor 104 are associated with a common customer account (e.g., a customer account 132 including data associated with the product 102 and the possessor 104).

The location module 126 is a component of the product return environment 120 that determines whether a product 102 being returned is in a predetermined location area (e.g., for surrendering the product 102 to the merchant). The location module 126 may analyze data associated with an article positioned in the predetermined location area, for example, to determine whether the article is the product 102. In some examples, the location module 126 determines that the product 102 being returned is in the predetermined location area if the article is determined to be the product 102.

The disposition module 128 is a component of the product return environment 120 that determines whether to approve the request for returning the product 102. The disposition module 128 may approve the request, for example, on condition that the product 102 being returned is in the predetermined location area. In some examples, the disposition module 128 notifies one or more users associated with the product return (e.g., customer, merchant) of the disposition.

The scan module 130 is a component of the product return environment 120 that monitors one or more predetermined areas. The scan module 130 may scan the predetermined areas, for example, to identify or detect one or more articles positioned in the predetermined areas. Data associated with the detected articles enable the request module 122, account module 124, location module 126, and/or disposition module 128 to perform one or more product return operations described herein. For example, the request module 122 and/or account module 124 may be used to identify a request for returning the product based on data associated with one or more articles detected in a predetermined request area. For another example, the account module 124, location module 126 and/or disposition module 128 may be used to identify that a product 102 is surrendered based on data associated with one or more articles detected in a predetermined location area.

In some examples, the computing device 100 includes an interface component 134 stored and/or maintained at the computer-readable media 114. When executed by the processor 112, the interface component 134 may cause the computing device 100 to perform functionality that facilitates product return communication (e.g., receiving and/or transmitting data) between the computing device 100 and one or more other computing systems and/or between the computing device 100 and a user using one or more user interfaces 136 (e.g., customer, merchant). The interface component 134 may include, for example, computer-executable instructions (e.g., a driver) for operating the user interfaces 136.

User interfaces 136 may include any output and/or input device that enables information to be presented to and/or received from the user, such as a sensor device, a camera, a radio-frequency identification (RFID) sensor, a near field communication (NFC) sensor, a photoreceptive light sensor, a global positioning system (GPS) transceiver, a display device, a touch screen display, a natural user interface, a microphone, an accelerometer, a speaker, a sound card, a vibration motor, a BLUETOOTH® brand wireless technology-enabled device, and the like. (BLUETOOTH® is a registered trademark of Bluetooth Special Interest Group). The user interfaces 136 may be internal to the computing device 100, external to the computing device 100, or both (as shown in FIG. 1).

In some examples, one or more applications, such as the product return environment 120, communicate with counterpart applications or services such as web services accessible via a communication network 140 that enables data to be transferred between a plurality of computing systems coupled to the communication network 140. For example, the applications may represent downloaded client-side applications that correspond to server-side services executing in a cloud. Additionally, or alternatively, the applications may represent server-side applications that enable client-side services to be provided at one or more client devices. A user device 150, for example, may communicate with the computing device 100 (e.g., via the communication network 140) to allow a customer, such as a user 152 of the user device 150, to enter into one or more return transactions.

In some examples, the user device 150 provides an instance of the product return environment 120 for receiving user input from and presenting content to the user 152 while product return operations are performed on the backend at the computing device 100. The user device 150 may include an operating system that enables the instance of the product return environment 120 to be provided in a user-friendly manner. For example, the operating system may include one or more application program interfaces (APIs) that enable the user device 150 to receive user input from and present content to the user 152 using a user interface 154 and/or to receive data from and transmit data to one or more other computing systems (e.g., computing device 100) using a network interface 156.

In some examples, a possessor 104 of a product 102 uses the user device 150 to enter into a return transaction for returning the product 102 (e.g., the possessor 104 is a user 152 of the user device 150). If the possessor 104 is in possession of a user device 150, the user device 150 may be used to identify the possessor 104 as an authorized user of a customer account 132 associated with the user device 150. Alternatively, a customer other than the possessor 104 may use the user device 150 to participate in at least a portion of the return transaction (e.g., the possessor 104 is not a user 152 of the user device 150). If the possessor 104 is not in possession of a user device 150 associated with a customer account 132, the user device 150 may be used to obtain permission from a user 152 of the user device 150 for allowing the possessor 104 to return a product 102 associated with the customer account 132.

Figure 2:
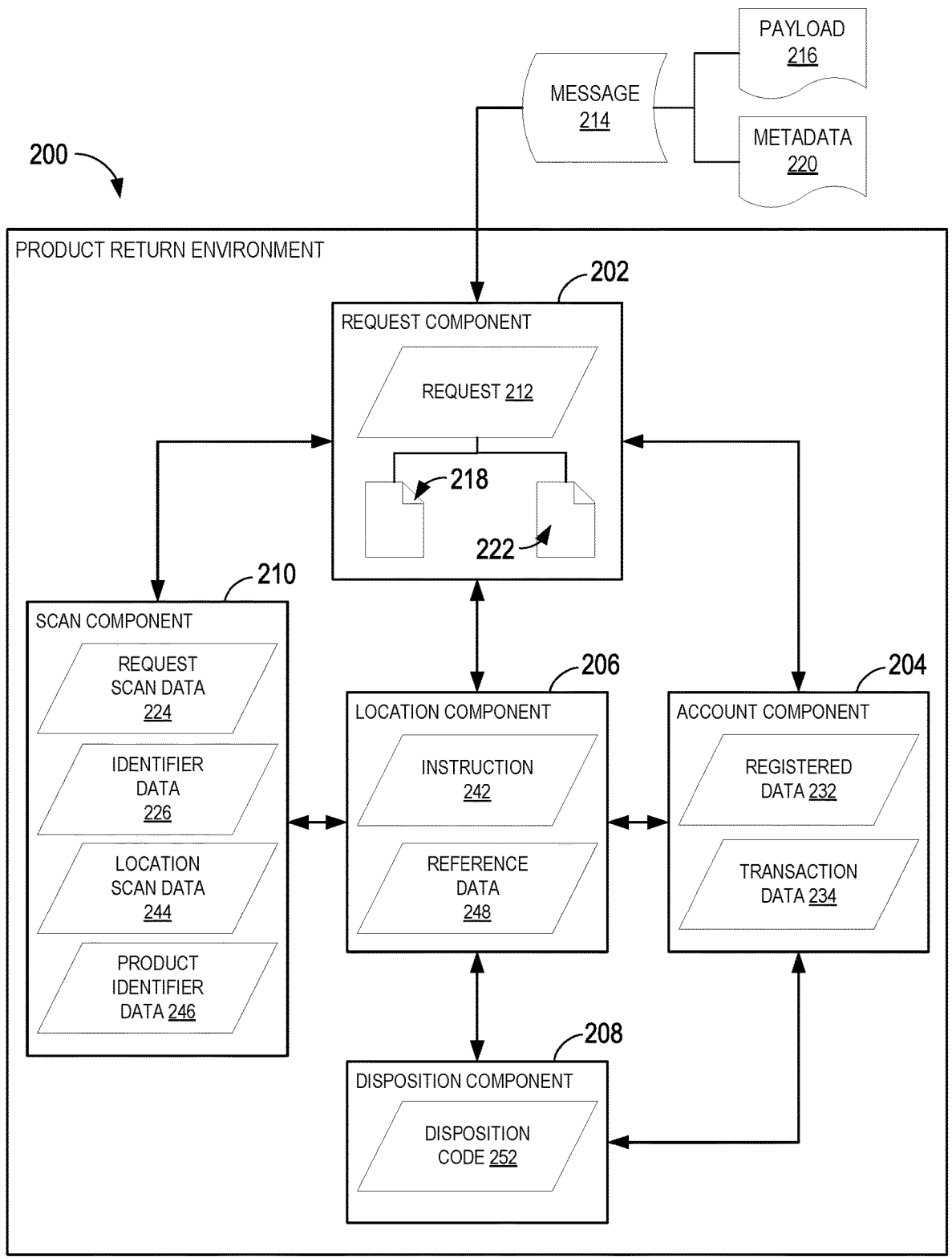
FIG. 2 is a block diagram illustrating an example product return environment that may be used with a computing device, such as the computing device shown in FIG. 1.

FIG. 2 is a block diagram illustrating an example product return environment 200 for managing product returns. The product return environment 200 is an example of one implementation of the product return environment 120 in FIG. 1. The product return environment 200 includes a request component 202, an account component 204, a location component 206, a disposition component 208, and a scan component 210.

The request component 202 is configured to identify a request 212 for returning a product 102. In some examples, the request component 202 identifies a text-based message (e.g., received from a user device 150) or, more broadly, a message 214 as the request 212. Messages 214 may include, for example, a short message service (SMS) message, an enhanced messaging service (EMS) message, a multimedia messaging service (MMS), an instant messaging (IM) message, an email message, and the like. In some examples, a user device 150 uses one or more mobile applications ("apps") to generate and transmit the message 214 to the product return environment 200.

The message 214 includes a payload 216 or content indicative of a user desire to return the product 102. First identifier data 218 associated with the product 102 (e.g., product identifier data), for example, may be identified or extracted from the payload 216. In some examples, the user device 150 generates the payload 216 to include first identifier data 218 based on user input identifying the product 102 to be returned. The message 214 also includes metadata 220 or information other than the payload 216 that enables an origin or a sender of the message 214 (e.g., user device 150, user 152) to be identified. Second identifier data 222 associated with one or more articles other than the product 102 (e.g., device identifier data, user identifier data), for example, may be identified or extracted from the metadata 220.

Additionally, or alternatively, the request component 202 may identify the request 212 based on one or more articles (e.g., product 102, possessor 104, an identification card, user device 150, a purchase receipt) positioned in a predetermined request area. The request component 202 may identify the articles using the scan component 210. For example, the scan component 210 may scan the predetermined request area using one or more sensor devices (e.g., a camera, an RFID sensor, an NFC sensor), and detect the articles. The possessor 104 may present the articles by positioning and/or moving the articles in the predetermined request area such that the articles are detectable by the sensor devices. The scan component 210 may generate request scan data 224 associated with the detected articles, and analyze the request scan data 224 (e.g., using image recognition technology) to identify or extract identifier data 226 associated with the detected articles from the request scan data 224.

The request 212 may be identified on condition that the identifier data 226 is indicative of a user desire to return a product 102. In some examples, the request component 202 identifies the request 212 on condition that the identifier data 226 includes first identifier data 218 associated with a product 102 and second identifier data 222 associated with one or more articles other than the product 102 (e.g., device identifier data, user identifier data, transaction identifier data). In this manner, a user desire to return a product 102 may be demonstrated by positioning a product 102 in the predetermined request area with one or more articles (e.g., possessor 104, an identification card of the possessor 104, user device 150, a purchase receipt) that may be used to associate a possessor 104 with the product 102.

In some examples, the request component 202 prompts a customer (e.g., possessor 104, user 152) to provide additional information. The additional information may be requested to confirm the request 212. Additionally, or alternatively, additional information may be requested to enhance previously-received identifier data for enabling the request 212 to be identified and/or authorized. The customer may be prompted using the user interface 136 and/or user device 150.

The request component 202 may authorize the request 212, for example, based on an eligibility of the product 102 to be returned and/or an authorization of the possessor 104 to return the product 102. In some examples, the request component 202 compares first identifier data 218 and/or second identifier data 222 associated with the request 212 with data associated with one or more customer accounts 132 to identify a customer account 132 associated with the request 212. The customer account 132 may be used to determine whether the product 102 is eligible for the product return and/or to determine whether the possessor 104 is authorized to return the product 102.

Data associated with a customer account 132 includes registered data 232 and/or transaction data 234. Registered data 232 may be used to identify and/or authenticate one or more entities associated with a customer account 132 (e.g., a "registered" entity), such as a registered product (e.g., a product 102 associated with the customer account 132), a registered user (e.g., a customer associated with the customer account 132), and/or a registered device (e.g., a user device 150 associated with the customer account 132). Registered data 232 may include, for example, a username, an identification number, a password, a personal identification number (PIN), a signature, a voiceprint, a body posture or gesture, biometric data, a public key infrastructure (PKI) certificate, a security token, a BLUETOOTH® brand wireless technology identifier, an RFID identifier, an NFC identifier, a routing number, a media access controller (MAC) address, an Internet Protocol (IP) address, a phone number, an email address, a mailing address, and the like. In some examples, the account module 124 uses registered data 232 to locate and/or contact one or more registered entities and/or to allow the registered entities to access or use the customer account 132.

Transaction data 234 may be used to record or document one or more transactions. Transaction data 234 may include, for example, a transaction identifier, a transaction date, a transaction time, a transaction location, a transaction amount, a transaction description, a transaction type (e.g., a purchase, a return), and/or any other information that enables a transaction, a product 102 associated with the transaction, and/or a customer associated with the transaction to be identified. In some examples, the account module 124 associates transaction data 234 with a customer account 132 if a registered entity is a part of the transaction.

The location component 206 determines whether a product 102 being returned is in a predetermined location area. In some examples, the location component 206 generates an instruction 242 to prompt a possessor 104 of the product 102 to position the product 102 in the predetermined location area. The instruction 242 may be presented, for example, using the user interface 136 and/or the user device 150. Upon identifying that the predetermined location area is occupied, the location component 206 determines whether the product 102 is positioned in the predetermined location area. The location component 206 may identify an article positioned in the predetermined location area using the scan component 210. For example, the scan component 210 may scan the predetermined location area using one or more sensor devices (e.g., a camera, an RFID sensor, an NFC sensor), and detect the article. The possessor 104 may present the article by positioning and/or moving the article in the predetermined request area such that the article is detectable by the sensor devices. The scan component 210 may generate location scan data 244 associated with the detected article, and analyze the location scan data 244 (e.g., using image recognition technology) to identify or extract product identifier data 246 from the location scan data 244.

The location component 206 identifies the product identifier data 246 associated with the article, and compares the identified product identifier data 246 with reference data 248 (e.g., product identifier data) associated with the product 102 being returned to determine whether the product 102 is positioned in the predetermined location area. The reference data 248 may be identified, for example, using the first identifier data 218. If the product identifier data 246 associated with the article corresponds to the reference data 248 associated with the product 102, the location component 206 determines that the product 102 is positioned in the predetermined location area. On the other hand, if the product identifier data 246 does not correspond to the reference data 248, the location component 206 determines that the product 102 is not positioned in the predetermined location area.

The disposition component 208 determines whether to approve the request 212 for returning the product 102. In some examples, the disposition component 208 approves the request 212 on condition that one or more metrics satisfy one or more predetermined thresholds. For example, the request 212 may be approved if the product 102 being returned is in the predetermined location area and the product 102 is in a physical condition that satisfies one or more physical parameters associated with the product 102. The disposition component 208 generates a disposition code 252 associated with the request 212. The disposition code 252 may be presented to a customer (e.g., possessor 104, user 152) using the user interface 136 and/or the user device 150. In some examples, the disposition component 208 uses the account component 204 to identify a user device 150 associated with a customer account 132, and transmits the disposition code 252 to the user device 150 for presentation to the user 152.

FIG. 3 is a flowchart illustrating an example method 300 for managing one or more product returns. The method 300 may be implemented at the computing device 100. In some examples, a request 212 for returning a product 102 is identified at 310. A message 214 received from a user device 150 may be identified as a request 212. Additionally, or alternatively, one or more articles detected in a predetermined request area may be identified as a request 212.

Upon authorizing the request 212, a customer may be prompted at 320 to position the product 102 in a predetermined location area. For example, an instruction 242 to position the product 102 in the predetermined location area may be generated and transmitted to a user interface 136 for prompting the customer (e.g., possessor 104) at the predetermined location area. Additionally, or alternatively, the instruction 242 may be transmitted to a user device 150 for prompting the customer (e.g., user 152) at or remote from the predetermined location area. In some examples, a customer account 132 associated with the request 102 is identified and used to identify the user device 150.

Location scan data 244 associated with an article (e.g., product 102) positioned in the predetermined location area is received at 330. The location scan data 244 may be received, for example, from one or more sensor devices (e.g., user interface 136). The location scan data 244 is analyzed to extract or identify at 340 product identifier data 246 associated with the article.

The product identifier data 246 associated with the article may be analyzed to determine at 350 whether the article is the product 102. In some examples, the product identifier data 246 associated with the article is compared with reference data 248 (e.g., product identifier data) associated with the product 102. If the product identifier data 246 corresponds to the reference data 248, for example, the article positioned in the predetermined location area is determined to be the product 102. The reference data 248 may be identified using first identifier data 218 associated with the product 102. In some examples, a disposition code 252 associated with the request 212 is generated and transmitted to a user device 150 associated with the customer account 132.

FIG. 4 is a sequence diagram illustrating example operations of a method 400 for managing one or more product returns. In some examples, a user device 150 generates at 402 a message 214 for message transmission at 404. The message 214 may include a payload 216 including first identifier data 218 associated with a product 102 to be returned (e.g., product identifier data), and metadata 220 including second identifier data 222 associated with the user device 150 and/or a user 152 of the user device 150 (e.g., device identifier data, user identifier data).

Additionally, or alternatively, a user interface 136 generates at 406 request scan data 224 for request scan data transmission at 408. The request scan data 224 may include first identifier data 218 associated with a product 102 to be returned (e.g., product identifier data), and second identifier data 222 associated with the user device 150, a user 152 of the user device 150, and/or a purchase receipt associated with the product 102 (e.g., device identifier data, user identifier data, transaction identifier data).

A system server 410 receives the message 214 and/or request scan data 224, and analyzes the message 214 and/or request scan data 224 to identify at 420 a request 212 for returning a product 102. Upon identifying the request 212, the system server 410 may determine a likelihood of the product 102 being eligible for the product return and/or a likelihood of the possessor 104 being authorized to return the product 102. The product 102 may be identified using product identifier data associated with the request 212. The system server 410 may authorize the request 212, for example, if the message 214 is received from a registered user device and is associated with the product return of a registered product. For another example, the request 212 may be authorized if a registered product is positioned in a predetermined request area with an authenticated article (e.g., the possessor 104 is a registered user, has permission from a registered user, has a registered user device, and/or has a purchase receipt that identifies the product 102).

The system server 410 generates at 430 an instruction 242 for prompting a user to position the product 102 in a predetermined location area. The instruction 242 may be transmitted at 432 to the user device 150 for presentation at 434 and/or transmitted at 436 to the user interface 136 for presentation at 438.

The user interface 136 generates at 440 location scan data 244 for transmission at 442. The location scan data 244 may be generated, for example, based on one or more articles detected in the predetermined location area. The system server 410 receives the location scan data 244, and analyzes the location scan data 244 to generate at 450 product identifier data 246 associated with the detected articles.

The product identifier data 246 may be compared at 460 with reference data 248 associated with the product 102 to determine whether the product 102 is positioned in the predetermined location area. If the product 102 is positioned in the predetermined location area, the system server 410 generates at 470 a disposition code 252 associated with an approval of the request 212. On the other hand, if the product 102 is not positioned in the predetermined location area, the system server 410 generates a disposition code 252 associated with a declination of the request 212. The disposition code 252 may be transmitted at 472 to the user device 150 for presentation at 480.

FIG. 5 is a flow diagram illustrating an example data flow 500 within a product return environment for managing a product return. The data flow 500 may be an illustrative example of one implementation within the product return environment 120 in FIG. 1 and/or the product return environment 200 in FIG. 2. The data flow 500 includes a request phase 510, a location phase 520, and a disposition phase 530.

During the request phase 510, a server-side application 540 (e.g., at a computing device 100) identifies a request 212 for returning a product 102. For example, a message 214 generated using a client-side application 542 (e.g., at a user device 150) may be identified as the request 212 on condition that the message 214 includes first identifier data 218 associated with the product 102 to be returned (e.g., product identifier data) and second identifier data 222 associated with one or more articles other than the product 102 (e.g., device identifier data, user identifier data). In some examples, the server-side application 540 analyzes the message 214 to identify or extract the second identifier data 222 from metadata 220 (e.g., rather than from the payload 216).

Additionally or alternatively, one or more articles positioned in a predetermined request area (e.g., product 102, possessor 104, user device 150, a purchase receipt) may be detected using a monitoring system 544 (e.g., at a user interface 136) to identify the request 212 on condition that the detected articles are associated with first identifier data 218 associated with the product 102 to be returned (e.g., product identifier data) and second identifier data 222 associated with one or more articles other than the product 102 (e.g., device identifier data, user identifier data). In some examples, the server-side application 540 may use a purchase receipt to identify first identifier data 218 and/or second identifier data 222. For example, the first identifier data 218 and/or second identifier data 222 may be available on the purchase receipt. Additionally, or alternatively, transaction identifier data associated with the purchase receipt (e.g., a gift receipt) may be compared with transaction data 234 associated with one or more transactions to identify a transaction associated with the purchase receipt, and product identifier data, device identifier data, and/or user identifier data associated with the identified transaction may be used to identify the first identifier data 218 and/or second identifier data 222.

In some examples, the server-side application 540 analyzes the request 212 to determine whether to proceed to the location phase 520. The data flow 500 may proceed to the location phase 520, for example, on condition that the product 102 is eligible for the product return and/or the possessor 104 is authorized to return the product 102. Eligible products 102 may include one or more products 102 purchased from a merchant that is associated with the product return environment 120 and/or product return environment 200. Reference data 248 associated with one or more eligible products 120 may be stored and/or maintained at a memory area 546 (e.g., computer-readable media 114). In this manner, first identifier data 218 associated with the request 212 may be compared with the reference data 248 to determine whether the product 102 is eligible for the product return. The product 102 may be identified as being eligible for the product return if, for example, the first identifier data 218 corresponds to reference data 248.

A possessor 104 may be allowed to return the product 102 if, for example, the possessor 104 is associated with, and/or has permission from a customer that is associated with, the product 102. In some examples, the server-side application 540 uses a purchase receipt to determine whether the possessor is associated with the product 102. The possessor 104 may be allowed to return the product 102 if the purchase receipt includes product identifier data associated with the product 102.

Additionally, or alternatively, the server-side application 540 may use one or more customer accounts 132 stored and/or maintained at the memory area 546 to determine whether the possessor 104 is associated with the product 102. In some examples, the server-side application 540 compares first identifier data 218 and/or second identifier data 222 associated with the request 212 with registered data 232 and/or transaction data 234 associated with one or more customer accounts 132 to identify a customer account 132 associated with the product 102 and/or the possessor 104. In this manner, the possessor 104 may be allowed to return the product 102 if the first identifier data 218 and the second identifier data 222 are associated with a common customer account 132.

Second identifier data 222 associated with a customer and/or with a user device 150 associated with the customer (e.g., user identifier data, device identifier data), for example, may be compared with registered data 232 and/or transaction data 234 to identify a first customer account 132 that is associated with the possessor 104 and/or the user device 150 (e.g., a customer account 132 of which the possessor 104 is a registered user or a user device 150 is a registered device). The second identifier data 222 may be identified or extracted from the payload 216 and/or metadata 220 of a message 214 and/or from request scan data 224 associated with one or more articles positioned in the predetermined request area.

First identifier data 218 associated with the product 102 (e.g., product identifier data) may be compared with registered data 232 and/or transaction data 234 to determine whether the product 102 is associated with a customer account 132 (e.g., whether the product 102 is a registered product, was purchased using a user device 150 associated with the customer account 132, and/or was purchased by a customer using the customer account 132). The first identifier data 218 may be identified or extracted from the payload 216 of a message 214 and/or from request scan data 224 associated with one or more articles positioned in the predetermined request area.

If a possessor 104 in the predetermined request area is not associated with a customer account 132 that is associated with a user device 150 from which the message 214 was received and/or a product 102 or user device 150 positioned in the predetermined request area, the server-side application 540 may communicate with the user device 150 to authenticate the possessor 104 as an authorized user of the customer account 132. For example, if the user device 150 is remote from the predetermined request area (e.g., the possessor 104 does not possess the user device 150), the user device 150 may be used to obtain permission, from a user 152 of the user device 150, for allowing the possessor 104 to return the product 102. On the other hand, if the user device 150 is positioned in the predetermined request area (e.g., the possessor 104 possess the user device 150), the user device 150 may prompt the user 152 of the user device 150 (e.g., the possessor 104) to provide additional information (e.g., a password, a PIN, biometric data) that may be used to authenticate the possessor 104. Additionally, or alternatively, a user interface 136 may be used to prompt the possessor 104 to provide additional information (e.g., a password, a PIN, biometric data) that may be used to authenticate the possessor 104.

In some examples, one or more confidence scores are generated to determine whether to identify and/or authorize the request 212. The confidence scores may represent, for example, a likelihood of the articles positioned in the predetermined request area being indicative of a user desire to return a product 102. If identifier data 226 associated with the articles includes first identifier data 218 and second identifier data 222, the confidence scores may indicate that the user desire to return the product 102 is likely. If the identifier data 226 does not include the first identifier data 218 and the second identifier data 222, the confidence scores may not indicate that the user desire to return the product 102 is likely.

For another example, the confidence scores may represent a likelihood of the possessor 104 being associated with the product 102. If the first identifier data 218 and second identifier data 222 correspond to the registration data 232 and/or transaction data 234 associated with the customer account 132, the confidence scores may indicate that the possessor 104 being associated with the product 102 is likely. If the first identifier data 218 and second identifier data 222 do not correspond to the registration data 232 and/or transaction data 234, the confidence scores may not indicate that the possessor 104 being associated with the product 102 is likely.

During the location phase 520, the server-side application 540 generates an instruction 242 to prompt the possessor 104 to position the product 102 in a predetermined location area. The instruction 242 may be transmitted to the user interface 136 for presentation at a locker system 548 and/or to the user device 150 for presentation using the client-side application 542. The locker system 548 may systematically (e.g., with each generated instruction 242) and/or periodically (e.g., at predetermined time intervals) scan the predetermined location area, and generate product identifier data 246 associated with one or more articles detected in the predetermined location area.

In some examples, the server-side application 540 analyzes the product identifier data 246 to determine whether to proceed to the disposition phase 530. The data flow 500 may proceed to the disposition phase 530 on condition that the product 102 is positioned in the predetermined location area. The product identifier data 246 may be compared with reference data 248, for example, to determine whether the product 102 is positioned in the predetermined location area. The reference data 248 may be identified using first identifier data 218 associated with the product 102.

In some examples, the server-side application 540 generates a confidence score representing a likelihood of the article being the product 102. The confidence score may be generated based on a comparison of the product identifier data 246 and the reference data 248. If the product identifier data 246 corresponds to the reference data 248, the server-side application 540 generates the confidence score to indicate that the article positioned in the predetermined location area is likely to be the product 102. On the other hand, if the product identifier data 246 does not correspond to the reference data 248, the server-side application 540 does not generate a confidence score that indicates that the article positioned in the predetermined location area is likely to be the product 102.

During the disposition phase 530, the server-side application 540 generates a disposition code 252 for presentation to the customer. The disposition code 252 may be used to provide confirmation of the approval or declination of the request 212. In some examples, the server-side application 540 transmits the disposition code 252 to the user device 150 for presentation using the client-side application 542. Additionally, or alternatively, the disposition code 252 may be transmitted to the user interface 136 for presentation at the locker system 548. The disposition code 252 may also be stored at the memory area 546 and associated with the customer account 132 (e.g., for later retrieval or use).

In some examples, the server-side application 540 generates transaction data 234 to incorporate and/or be associated with the disposition code 252. In this manner, the disposition code 252 may be used, directly or indirectly, to affect a processing of one or more transactions associated with the customer account 132. For example, if a disposition code 252 indicates that a product 102 was returned in a previously-processed transaction (e.g., a first transaction), a request 212 for returning the product 102 in a subsequent transaction (e.g., a second transaction) may be declined or flagged for further review. For another example, a disposition code 252 may be used to generate a customer profile that may be used to authorize and/or approve one or more requests 212 associated with the customer account 132. The customer profile may be used, for example, to confirm or modify one or more predetermined thresholds used to determine whether a request 212 is authorized or approved.

As depicted in this illustrative data flow, a request 212 for returning a product 102 may be processed to facilitate a product return. The request 212 may include, for example, product identifier data (e.g., first identifier data 218) and identifier data associated with an entity other than the product 102 (e.g., second identifier data 222), such as device identifier data, user identifier data, and/or transaction identifier data. The request 212 is processed to generate a disposition code 252 associated with the product return. The disposition code 252 may be output to or by a product return system, which may be a client-side application 542 in some examples.

Figure 6:
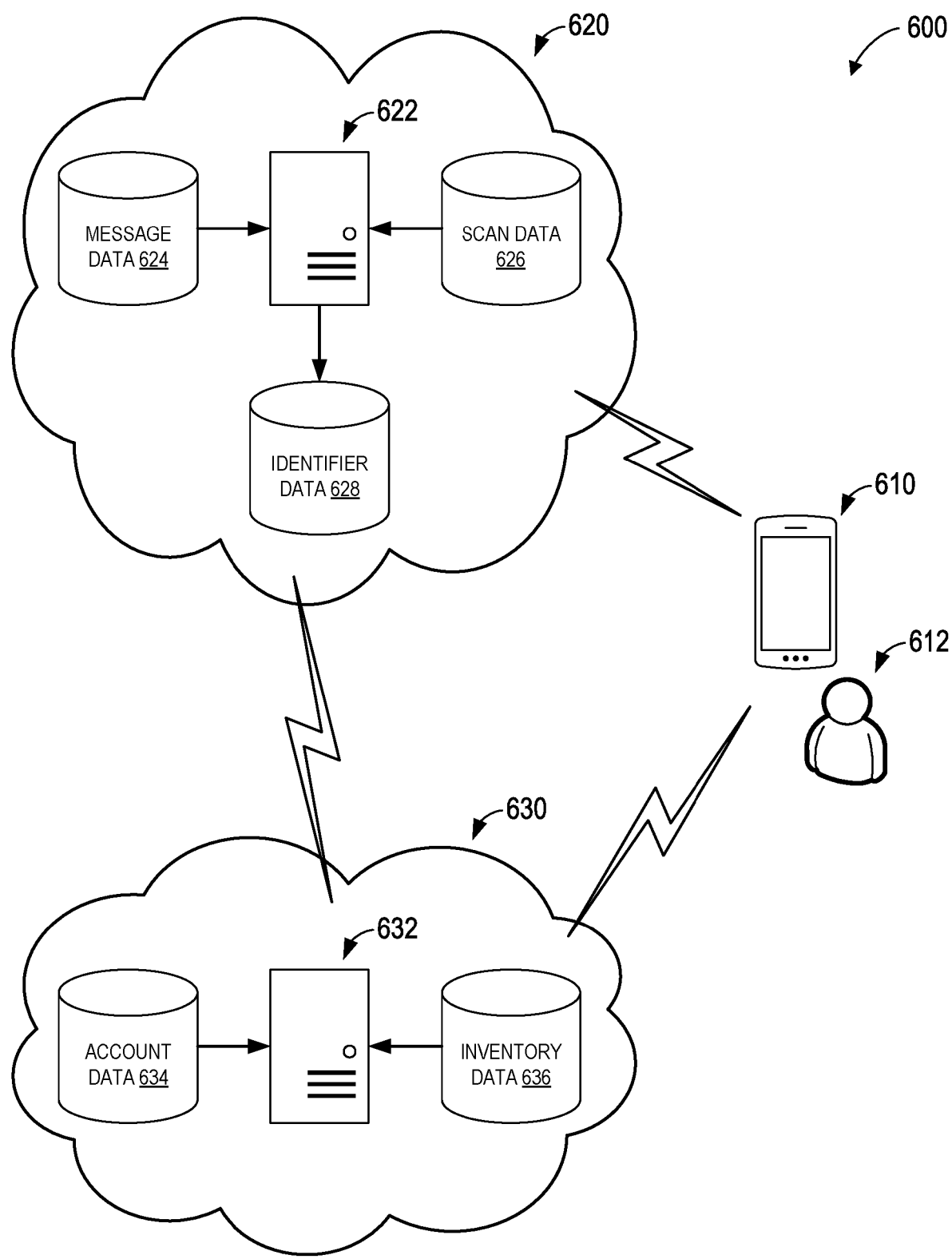
FIG. 6 is a block diagram illustrating an example product return environment operating as a cloud-based service.

FIG. 6 is a block diagram illustrating an example product return environment 600 operating as a cloud-based service. The product return environment 600 may be an illustrative example of the product return environment 120 in FIG. 1 and/or product return environment 200 in FIG. 2. The product return environment 600 may be implemented in a cloud-based environment, with one or more operations performed in the cloud. In some examples, a client-side product return application residing on a client device (e.g., user device 150), such as a mobile telephone 610, enables a user 612 of the mobile telephone 610 (e.g., user 152) to return a product 102 using the mobile telephone 610.

The mobile telephone 610 may be communicatively coupled to a cloud location 620, via a communication network (e.g., communication network 140) or other network, to transmit data that may be interpreted or identified as a request 212 for returning a product 102, such as one or more messages 214 and/or request scan data 224. The cloud location 620 may include a virtual server 622 associated with a merchant. The virtual server 622 may perform one or more product return operations, such as those depicted in FIGS. 3-5. For example, the virtual server 622 may process message data 624 (e.g., message 214) and/or scan data 626 (e.g., request scan data 224, location scan data 244) to identify identifier data 628 (e.g., first identifier data 218, second identifier data 222, product identifier data 246).

The cloud location 620 may be communicatively coupled to a cloud location 630, via the communication network or other network, to enable the virtual server 622 to provide one or more product return services for user 612 of the mobile telephone 610. In some examples, the cloud location 630 includes a virtual server 632 that supports for one or more product return operations provided at the virtual server 622. The virtual server 632 may store and/or maintain account data 634 associated with one or more customer accounts 132 (e.g., registered data 232, transaction data 234) and/or inventory data 636 associated one or more products 102 (e.g., reference data 248). In some examples, the account data 634 includes one or more disposition codes 252 associated with one or more requests 212. The disposition codes 252 may be output to the client-side product return application residing on the mobile telephone 630.

Alternatively, or in addition to the other examples described herein, examples include any combination of the following:

identifying identifier data associated with a product 102, a user device 150, a customer, and/or a purchase receipt;

analyzing a message to identify identifier data associated with a product 102, a user device 150, a customer, and/or a purchase receipt;

generating request scan data 224 associated with a product 102, a user device 150, a customer, and/or a purchase receipt;

analyzing request scan data 224 to identify identifier data associated with a product 102, a user device 150, a customer, and/or a purchase receipt;

using product identifier data associated with a product 102 to identify the product 102;
using user identifier data associated with a customer to identify the customer;
using device identifier data associated with a user device 150 to identify the user device 150;
using transaction identifier data associated with a purchase receipt to identify a transaction;
generating an instruction to provide additional information associated with a product 102, a user device 150, a customer, and/or a purchase receipt;
enhancing identifier data with additional information associated with a product 102, a user device 150, a customer, and/or a purchase receipt;
identifying a request 212 for returning a product 102;
analyzing identifier data to identify a request 212 for returning a product 102;
determining whether a product 102 is eligible for a product return;
determining whether a customer is authorized to return the product 102;
identifying a customer account 132 associated with a request 212 for returning a product 102;
comparing identifier data associated with a product 102, a user device 150, a customer, and/or a purchase receipt with registered data 232 and/or transaction data 234 associated with one or more customer accounts 132 to identify a customer account 132;
analyzing registered data 232 and/or transaction data 234 associated with a customer account 132 to identify a product 102 associated with the customer account 132, a user device 150 associated with the customer account 132, a customer associated with the customer account 132, and/or a transaction associated with the customer account 132;
authenticating a customer as an authorized user of a customer account 132;
comparing identifier data associated with a product 102, a user device 150, a customer, and/or a purchase receipt with registered data 232 and/or transaction data 234 associated with a customer account 132 to authenticate a customer as an authorized user of the customer account 132;
generating an instruction 242 to position a product 102 in a predetermined area;
prompting a customer to position a product 102 in a predetermined area;
determining whether a product 102 is positioned in a predetermined area;
generating location scan data 244 associated with an article;
analyzing location scan data 244 to identify product identifier data 246 associated with an article;
analyzing product identifier data 246 associated with an article to determine whether the article is a product 102;
identifying reference data 248 associated with a product 102;
comparing product identifier data 246 associated with an article with reference data 248 associated with a product 102 to determine whether the article is the product 102;
approving a request 212 for returning a product 102; or
generating a disposition code 252 associated with a request 212 for returning a product 102.

In some examples, the operations illustrated in FIGS. 3-5 may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

While the aspects of the disclosure have been described in terms of various examples with their associated operations, a person skilled in the art would appreciate that a combination of operations from any number of different examples is also within scope of the aspects of the disclosure.

While no personally identifiable information is tracked by aspects of the disclosure, examples have been described with reference to data monitored and/or collected from the users. In some examples, notice may be provided to the users of the collection of the data (e.g., via a dialog box or preference setting) and users are given the opportunity to give or deny consent for the monitoring and/or collection. The consent may take the form of opt-in consent or opt-out consent.

Example Operating Environment

Figure 7:
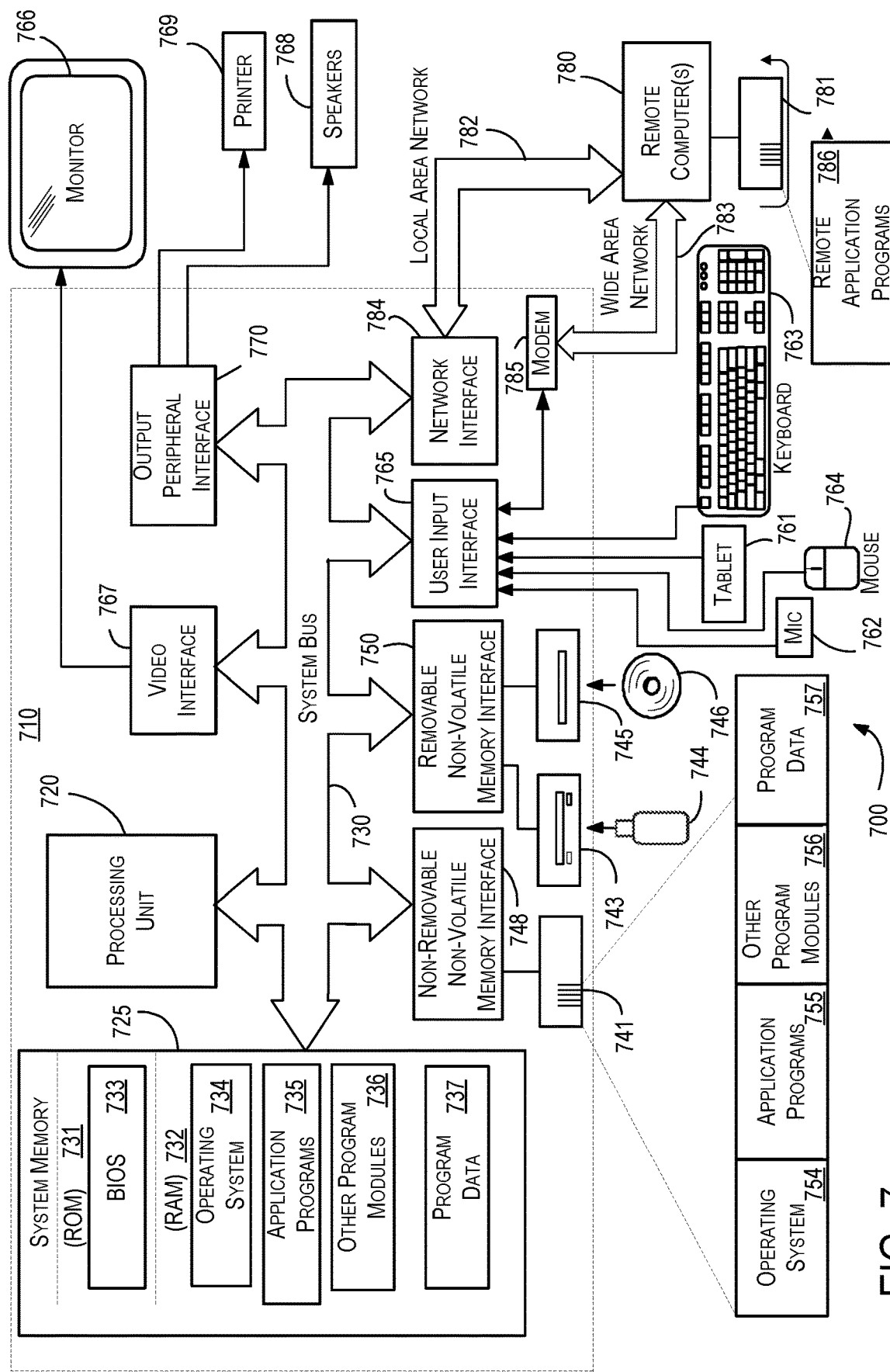
FIG. 7 is a block diagram illustrating an example operating environment for a computing device, such as the computing device shown in FIG. 1.

FIG. 7 is a block diagram illustrating an example operating environment 700 for a computing device (e.g., computing device 100). The computing system environment 700 is only one example of a suitable computing environment and is not intended to suggest any limitation as to the scope of use or functionality of the disclosure. Neither should the computing environment 700 be interpreted as having any dependency or requirement relating to any one or combination of components illustrated in the example operating environment 700.

The disclosure is operational with numerous other general purpose or special purpose computing system environments or configurations. Examples of well-known computing systems, environments, and/or configurations that may be suitable for use with the disclosure include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The disclosure may be described in the general context of computer-executable instructions, such as program modules, being executed by a computer. Generally, program modules include routines, programs, objects, components, data structures, and so forth, which perform particular tasks or implement particular abstract data types. The disclosure may also be practiced in distributed computing environments where tasks are performed by remote processing devices that are linked through a communications network. In a distributed computing environment, program modules may be located in local and/or remote computer storage media including memory storage devices and/or computer storage devices. As used herein, computer storage devices refer to hardware devices.

With reference to FIG. 7, an example system for implementing various aspects of the disclosure may include a general purpose computing device in the form of a computer 710. Components of the computer 710 may include, but are not limited to, a processing unit 720, a system memory 725, and a system bus 730 that couples' various system components including the system memory to the processing unit 720. The system bus 730 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 710 typically includes a variety of computer-readable media. Computer-readable media may be any available media that may be accessed by the computer 710 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or the like. Read only memory (ROM) 731 and random access memory (RAM) 732 are examples of computer storage media. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by the computer 710. Computer storage media does not, however, include propagated signals. Rather, computer storage media excludes propagated signals. Any such computer storage media may be part of computer 710.

Communication media typically embodies computer-readable instructions, data structures, program modules or the like in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

The system memory 725 includes computer storage media in the form of volatile and/or nonvolatile memory such as ROM 731 and RAM 732. A basic input/output system 733 (BIOS), containing the basic routines that help to transfer information between elements within computer 710, such as during start-up, is typically stored in ROM 731. RAM 732 typically contains data and/or program modules that are immediately accessible to and/or presently being operated on by processing unit 720. By way of example, and not limitation, FIG. 7 illustrates operating system 734, application programs, such as application programs 735 (e.g., a product return environment), other program modules 736 and program data 737.

The computer 710 may also include other removable/non-removable, volatile/nonvolatile computer storage media. By way of example only, FIG. 7 illustrates a hard disk drive 741 that reads from or writes to non-removable, nonvolatile magnetic media, a universal serial bus (USB) port 743 that provides for reads from or writes to a removable, nonvolatile memory 744, and an optical disk drive 745 that reads from or writes to a removable, nonvolatile optical disk 746 such as a CD ROM or other optical media. Other removable/non-removable, volatile/nonvolatile computer storage media that may be used in the example operating environment include, but are not limited to, magnetic tape cassettes, flash memory cards, digital versatile disks, digital video tape, solid state RAM, solid state ROM, and the like. The hard disk drive 741 is typically connected to the system bus 730 through a non-removable memory interface such as interface 748, and USB port 743 and optical disk drive 745 are typically connected to the system bus 730 by a removable memory interface, such as interface 750.

The drives and their associated computer storage media, described above and illustrated in FIG. 7, provide storage of computer-readable instructions, data structures, program modules and other data for the computer 710. In FIG. 7, for example, hard disk drive 741 is illustrated as storing operating system 754, application programs 755 (e.g., a product return environment), other program modules 756 and program data 757. Note that these components may either be the same as or different from operating system 734, application programs 735, other program modules 736, and program data 737. Operating system 754, application programs 755, other program modules 756, and program data 757 are given different numbers herein to illustrate that, at a minimum, they are different copies. A user may enter commands and information into the computer 710 through input devices such as a tablet, or electronic digitizer, 761, a microphone 762, a keyboard 763 and pointing device 764, commonly referred to as mouse, trackball or touch pad. Other input devices not shown in FIG. 7 may include a joystick, game pad, satellite dish, scanner, or the like. These and other input devices are often connected to the processing unit 720 through a user input interface 765 that is coupled to the system bus, but may be connected by other interface and bus structures, such as a parallel port, game port or a universal serial bus (USB). A monitor 766 or other type of display device is also connected to the system bus 730 via an interface, such as a video interface 767. The monitor 766 may also be integrated with a touch-screen panel or the like. Note that the monitor and/or touch screen panel may be physically coupled to a housing in which the computing device 710 is incorporated, such as in a tablet-type personal computer. In addition, computers such as the computing device 710 may also include other peripheral output devices such as speakers 768 and printer 769, which may be connected through an output peripheral interface 770 or the like.

The computer 710 may operate in a networked environment using logical connections to one or more remote computers, such as a remote computer 780. The remote computer 780 may be a personal computer, a server, a router, a network PC, a peer device or other common network node, and typically includes many or all of the elements described above relative to the computer 710, although only a memory storage device 781 has been illustrated in FIG. 7. The logical connections depicted in FIG. 7 include one or more local area networks (LAN) 782 and one or more wide area networks (WAN) 783, but may also include other networks. Such networking environments are commonplace in offices, enterprise-wide computer networks, intranets and the Internet.

When used in a LAN networking environment, the computer 710 is connected to the LAN 782 through a network interface or adapter 784. When used in a WAN networking environment, the computer 710 typically includes a modem 785 or other means for establishing communications over the WAN 783, such as the Internet. The modem 785, which may be internal or external, may be connected to the system bus 730 via the user input interface 760 or other appropriate mechanism. A wireless networking component such as comprising an interface and antenna may be coupled through a suitable device such as an access point or peer computer to a WAN or LAN. In a networked environment, program modules depicted relative to the computer 710, or portions thereof, may be stored in the remote memory storage device. By way of example, and not limitation, FIG. 7 illustrates remote application programs 785 as residing on memory device 781. It may be appreciated that the network connections shown are exemplary and other means of establishing a communication link between the computers may be used.

The examples illustrated and described herein as well as examples not specifically described herein but within the scope of aspects of the disclosure constitute an example product return environment. For example, the elements illustrated in FIGS. 1, 2, 6, and 7, such as when encoded to perform the operations illustrated in FIGS. 3-5, constitute an example means for obtaining first identifier data 218 and/or second identifier data 222 (e.g., request module 122, request component 202); an example means for identifying a request 212 for returning a product 102 (e.g., request module 122, request component 202); an example means for comparing first identifier data 218 and/or second identifier data 222 with registered data 232 associated with one or more customer accounts 132 to identify a first customer account 132 associated with a request 212 (e.g., account module 124, account component 204); an example means for determining whether a product 102 is associated with a possessor 104 of the product 102 (e.g., account module 124, account component 204); an example means for generating an instruction 242 to position a product 102 in a predetermined area (e.g., location module 126, location component 206); and/or an example means for determining whether a product 102 is positioned in a predetermined area (e.g., location module 126, location component 206).

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

While the disclosure is susceptible to various modifications and alternative constructions, certain illustrated examples thereof are shown in the drawings and have been described above in detail. It should be understood, however, that there is no intention to limit the disclosure to the specific forms disclosed, but on the contrary, the intention is to cover all modifications, alternative constructions, and equivalents falling within the spirit and scope of the disclosure.

What is claimed is:

1. A computing system for managing one or more product returns, the computing system comprising:
   a memory device storing data associated with one or more customer accounts and computer-executable instructions; and
   a processor configured to execute the computer-executable instructions to:
      receive, from a user device, a request for returning a product, the user device associated with device identifier data;
      compare the device identifier data with registered data associated with the one or more customer accounts to identify a first customer account of the one or more customer accounts that is associated with the user device;
      analyze transaction data associated with the identified first customer account to determine whether the product is associated with the first customer account;
      based on determining that the product is associated with the identified first customer account, generate an instruction to position the product in a predetermined area;
      cause one or more sensor devices to scan the predetermined area;
      receive scan data from the scan of the predetermined area;
      analyze the received scan data to determine a possessor of the product and a physical condition of the product;
         based on analyzing the received scan data:
            confirm the product is positioned in the predetermined area;
            determine whether the possessor of the product is associated with the identified first customer account;
            responsive to a determination that the possessor is not associated with the identified first customer account, communicate with the user device to obtain permission for the possessor to return the product, wherein the possessor is not an authorized user of the identified first customer account;
            determine whether the physical condition of the product satisfies one or more physical parameters associated with the product;
      responsive to a determination that the possessor is associated with the identified first customer account or receiving permission for the possessor to return the product and responsive to the determined physical condition satisfying the one or more physical parameters, approve the request for returning the product; and
      responsive to the possessor not receiving permission to return the product or the determined physical condition not satisfying the one or more physical parameters, decline the request for returning the product.

2. The computing system of claim 1, wherein the processor is further configured to execute the computer-executable instructions to:
   receive, from the user device, product identifier data associated with the product; and
   use the product identifier data to identify the product.

3. The computing system of claim 1, wherein the processor is further configured to execute the computer-executable instructions to:

receive, from the scan of the product, the scan data associated with the product;

analyze the scan data to identify product identifier data associated with the product; and use the product identifier data to identify the product.

4. The computing system of claim 1, wherein the processor is further configured to execute the computer-executable instructions to:

receive, from the user device, user identifier data associated with a user of the user device; and compare the user identifier data with the registered data to authenticate the user of the user device as an authorized user of the identified first customer account.

5. The computing system of claim 1, wherein the processor is further configured to execute the computer-executable instructions to:

receive, from the one or more sensor devices, the scan data associated with a purchase receipt;

analyze the scan data to identify product identifier data associated with the product; and based on the identified product identifier data, identify a possessor of the purchase receipt as an authorized user of the first customer account.

6. The computing system of claim 1, wherein the processor is further configured to execute the computer-executable instructions to:

receive, from the one or more sensor devices, the scan data associated with an article positioned in the predetermined area;

analyze the scan data to identify product identifier data associated with the article; and analyze the product identifier data to determine whether the article is the product.

7. The computing system of claim 1, wherein the scan data includes the physical condition of the product.

8. One or more computer storage media embodied with computer-executable instructions, the one or more computer storage media comprising:

a request component that, upon execution by at least one processor, obtains identifier data, and analyzes the identifier data to identify a request for returning a product, the identifier data associated with the product and one or more of a possessor of the product, a transaction associated with the product, a user device, or a user of the user device;

an account component that, upon execution by the at least one processor, compares the identifier data with registered data associated with one or more customer accounts to identify a first customer account of the one or more customer accounts that is associated with the request, and uses the identified first customer account to determine whether the possessor is associated with the product;

a location component that, upon execution by the at least one processor:

generates a prompt to position the product in a predetermined area; and based at least in part on a scan of the product, confirms the product is in the predetermined area; and a disposition component that, upon execution by the at least one processor:

determines whether a physical condition of the product satisfies one or more physical parameters associated with the product based at least in part on the scan of the product in the predetermined area;

determines whether the possessor of the product is associated with the identified first customer account;

responsive to a determination that the possessor is not associated with the identified first customer account, communicates with the user device to obtain permission for the possessor to return the product, wherein the possessor is not an authorized user of the identified first customer account;

responsive to a determination that the possessor is associated with the identified first customer account or receiving permission for the possessor to return the product and responsive to the determined physical condition satisfying the one or more physical parameters, approves the request for returning the product; and responsive to the possessor not being authenticated as the authorized user or the determined physical condition not satisfying the one or more physical parameters, declines the request for returning the product.

9. The one or more computer storage media of claim 8, wherein the request component is configured to:

analyze the identifier data to identify the user device;

generate an instruction to provide additional information;

provide, for the user device, the instruction to provide the additional information;

obtain, from the user device, the additional information; and enhance the identifier data with the additional information to enable the request for returning the product to be identified.

10. The one or more computer storage media of claim 8 further comprising a scan component configured to:

implement the scan of the product;

generate, from the scan, scan data associated with one or more of the product, the possessor of the product, the transaction associated with the product, the user device, or the user of the user device; and analyze the scan data to identify the identifier data, wherein the request component is configured to obtain the identified identifier data.

11. The one or more computer storage media of claim 8 further comprising a scan component configured to:

implement the scan of the product;

generate, from the scan, scan data associated with the product positioned in the predetermined area; and analyze the scan data to determine whether the product is positioned in the predetermined area.

12. The one or more computer storage media of claim 8, wherein the disposition component is further configured to:

generate a disposition code associated with the request.

13. A method for managing one or more product returns, the computer-implemented method comprising:

programming a computer with instructions to perform operations comprising:

identifying a request from a user device for returning a product, the user device associated with device identifier data;

identifying a customer account associated with the user device from a plurality of customer accounts based on the device identifier data;

analyzing transaction data associated with the identified customer account to determine whether the product is associated with the identified customer account;

responsive to a determination that the product is associated with the identified customer account, generating an instruction to position the product in a predetermined area;

receiving, from one or more sensor devices, scan data associated with an article positioned in the predetermined area;

analyzing the scan data to identify:
- a possessor of the article;
- product identifier data associated with the article; and
- a physical condition of the article;

analyzing, by a processor, the product identifier data associated with the article to determine the article is the product to facilitate a product return of the product;

responsive to a determination that the article is the product, analyzing the scan data to determine whether the possessor of the product is associated with the identified customer account;

responsive to a determination that the possessor of the product is not associated with the identified customer account, requesting permission from the user device for the possessor to return the product, wherein the possessor is not an authorized user of the identified first customer account;

responsive to a determination that the possessor is associated with the identified customer account or receiving the permission from the user device for the possessor to return the product determining, by the processor, whether the physical condition of the article satisfies one or more physical parameters;

responsive to the physical condition satisfying the one or more physical parameters, approving the request for returning the product; and responsive to the determination that the possessor of the product is not associated with the identified customer account and not receiving the permission from the user device or responsive to the physical condition not satisfying the one or more physical parameters, declining the request for returning the product.

14. The method of claim 13, the operations further comprising:

transmitting, to the user device, the instruction to position the product in the predetermined area.

15. The method of claim 13, wherein analyzing the product identifier data further comprises:
- identifying reference data associated with the product; and
- comparing the product identifier data with the reference data, wherein the article is determined to be the product on condition that the product identifier data corresponds to the reference data.

16. The method of claim 13, the operations further comprising:

receiving, from the one or more sensor devices, user scan data associated with the user; analyzing the user scan data to identify user identifier data associated with the user; and comparing the user identifier data with registered data associated with a customer account to identify the user as an authorized user of the customer account.

17. The method of claim 13, the operations further comprising:

identifying a customer account associated with the request for returning the product; receiving, from the one or more sensor devices, receipt scan data associated with a purchase receipt;

analyzing the receipt scan data to identify transaction identifier data associated with the purchase receipt; and comparing the transaction identifier data with transaction data associated with the customer account to identify the user as an authorized user of the customer account.

18. The method of claim 13, the operations further comprising:

identifying a customer account associated with the request for returning the product;

using the customer account to identify a user device associated with the customer account;

generating a disposition code associated with the request; and transmitting, to the user device, the disposition code associated with the request.

* * * * *